US012781749B2

(12) United States Patent
Tokieda et al.

(10) Patent No.: US 12,781,749 B2
(45) Date of Patent: Nov. 3, 2026

(54) ROTARY MACHINE AND TURBOCHARGER

(71) Applicant: IHI Corporation, Tokyo (JP)

(72) Inventors: Katsunori Tokieda, Tokyo (JP); Naoto Shimohara, Tokyo (JP)

(73) Assignee: IHI Corporation, Tokyo (JP)

( * ) Notice: Subject to any disclaimer, the term of this patent is extended or adjusted under 35 U.S.C. 154(b) by 0 days.

(21) Appl. No.: 19/272,055

(22) Filed: Jul. 17, 2025

(65) Prior Publication Data

US 2025/0347295 A1 Nov. 13, 2025

Related U.S. Application Data

(63) Continuation of application No. PCT/JP2024/004190, filed on Feb. 7, 2024.

(30) Foreign Application Priority Data

Feb. 10, 2023 (JP) ................................ 2023-019389

(51) Int. Cl.
*F04D 29/44* (2006.01)
*F04D 17/10* (2006.01)

(52) U.S. Cl.
CPC .......... *F04D 17/10* (2013.01); *F04D 29/444* (2013.01); *F05D 2220/40* (2013.01); *F05D 2240/12* (2013.01)

(58) Field of Classification Search
CPC .............................. F04D 29/442; F04D 29/46
See application file for complete search history.

(56) References Cited

U.S. PATENT DOCUMENTS

| | | | | |
|---|---|---|---|---|
| 2,350,839 | A | 6/1944 | Szydlowski | |
| 3,588,270 | A | 6/1971 | Boelcs | |
| 5,165,849 | A | 11/1992 | Nakagawa et al. | |
| 6,607,353 | B2 * | 8/2003 | Masutani | F04D 29/462 415/208.4 |
| 11,105,336 | B2 * | 8/2021 | Iwakiri | F04D 29/284 |
| 2012/0020776 | A1 | 1/2012 | Colson et al. | |
| 2019/0162075 | A1 | 5/2019 | Nakahara et al. | |

(Continued)

FOREIGN PATENT DOCUMENTS

| | | | |
|---|---|---|---|
| JP | 62-175298 | U | 11/1987 |
| JP | 4-116299 | A | 4/1992 |
| JP | 2004-100553 | A | 4/2004 |

(Continued)

OTHER PUBLICATIONS

International Search Report issued Apr. 23, 2024 in PCT/JP2024/004190 filed on Feb. 7, 2024, 2 pages.

*Primary Examiner* — Courtney D Heinle
*Assistant Examiner* — Danielle M. Christensen
(74) *Attorney, Agent, or Firm* — Oblon, McClelland, Maier & Neustadt, L.L.P.

(57) ABSTRACT

A rotary machine includes an impeller and a plurality of vanes arranged apart from each other in a circumferential direction of the impeller on a radially outer side with respect to the impeller, each of the vanes being provided in such a manner as to be turnable about a turning axis extending in a rotation axis direction of the impeller, the plurality of vanes including a first vane and a second vane, turning axes of the first vane and the second vane in the radial direction of the impeller have mutually different relative positions.

10 Claims, 5 Drawing Sheets

(56) References Cited

U.S. PATENT DOCUMENTS

| | | | |
|---|---|---|---|
| 2022/0325631 | A1 | 10/2022 | Ramb et al. |
| 2025/0179925 | A1 | 6/2025 | Ramb et al. |

FOREIGN PATENT DOCUMENTS

| | | | |
|---|---|---|---|
| JP | 2008-215250 | A | 9/2008 |
| JP | 2009-174458 | A | 8/2009 |
| JP | 2012-26443 | A | 2/2012 |
| JP | 2013-124624 | A | 6/2013 |
| JP | 2015-113714 | A | 6/2015 |
| JP | 2019-100337 | A | 6/2019 |
| JP | 2022-105880 | A | 7/2022 |
| JP | 2022-161035 | A | 10/2022 |
| JP | 2023-7748 | A | 1/2023 |

* cited by examiner

ROTARY MACHINE AND TURBOCHARGER

CROSS REFERENCE TO RELATED APPLICATIONS

This application is a continuation application of International Application No. PCT/JP2024/004190, filed on Feb. 7, 2024, which claims priority to Japanese Patent Application No. 2023-019389, filed on Feb. 10, 2023, the entire contents of which are incorporated by reference herein.

BACKGROUND ART

Technical Field

The present disclosure relates to a rotary machine and a turbocharger. The present application claims the benefit of priority based on Japanese Patent Application No. 2023-019389 filed on Feb. 10, 2023, the content of which is incorporated herein.

Related Art

In rotary machines such as centrifugal compressors, there are cases where vanes for adjusting the flow rate of a fluid are provided. Such vanes are also referred to as diffuser vanes. For example, in the centrifugal compressor disclosed in Patent Literature 1, a plurality of vanes is disposed apart in the circumferential direction of a compressor impeller on the radially outer side of the compressor impeller. When a fluid passes between vanes adjacent to each other, the flow rate of the fluid decreases, whereby the pressure increases.

CITATION LIST

Patent Literature

Patent Literature 1: JP 2013-124624 A

SUMMARY OF INVENTION

Technical Problem

As the diffuser vanes described above, there are cases where vanes provided in such a manner as to be turnable about the turning axis in the rotation axis direction of an impeller are used. In this case, when the vanes approach the impeller as the attitude of the vanes changes, the impeller rotates in the vicinity of the vanes, and the pressure acting on the impeller fluctuates. This may cause resonance in the impeller. Therefore, it is desired to suppress breakage of an impeller caused by resonance.

An object of the present disclosure is to provide a rotary machine and a turbocharger capable of suppressing a breakage of an impeller caused by resonance.

Solution to Problem

In order to solve the above problem, a rotary machine of the present disclosure includes: an impeller; and a plurality of vanes arranged apart from each other in a circumferential direction of the impeller on a radially outer side with respect to the impeller, each of the vanes being provided in such a manner as to be turnable about a turning axis extending in a rotation axis direction of the impeller, the plurality of vanes including a first vane and a second vane, turning axes of the first vane and the second vane in a radial direction of the impeller have mutually different relative positions.

In the plurality of vanes, the first vane and the second vane may be alternately arranged in the circumferential direction.

The rotary machine may further include: a first drive ring extending in the circumferential direction, the first drive ring being provided in such a manner as to be turnable in the circumferential direction; a first link having a first end engaged with the first drive ring and a second end provided in such a manner as to be turnable integrally with the first vane about the turning axis of the first vane; a second drive ring extending in the circumferential direction, the second drive ring being provided in such a manner as to be turnable in the circumferential direction; and a second link having a first end engaged with the second drive ring and a second end provided in such a manner as to be turnable integrally with the second vane about the turning axis of the second vane.

The plurality of vanes may be transitionable to a reference state in which the inclination with respect to the circumferential direction and the position in the radial direction of the first vane coincide with the inclination with respect to the circumferential direction and the position in the radial direction of the second vane, respectively.

In the reference state, the inclinations of the first vane and the second vane with respect to the circumferential direction may be minimized.

In order to solve the above-mentioned problem, the turbocharger of the present disclosure includes the rotary machine described above.

Effects

According to the present disclosure, breakage of an impeller caused by resonance can be suppressed.

DESCRIPTION OF EMBODIMENTS

Embodiments of the present disclosure will be described below by referring to the accompanying drawings. Dimensions, materials, other specific numerical values, and the like illustrated in the embodiments are merely an example for facilitating understanding, and the present disclosure is not limited thereto unless otherwise specified. Note that, in the present specification and the drawings, components having substantially the same function and structure are denoted by the same symbol, and redundant explanations are omitted. Illustration of components not directly related to the present disclosure is omitted.

Figure 1:
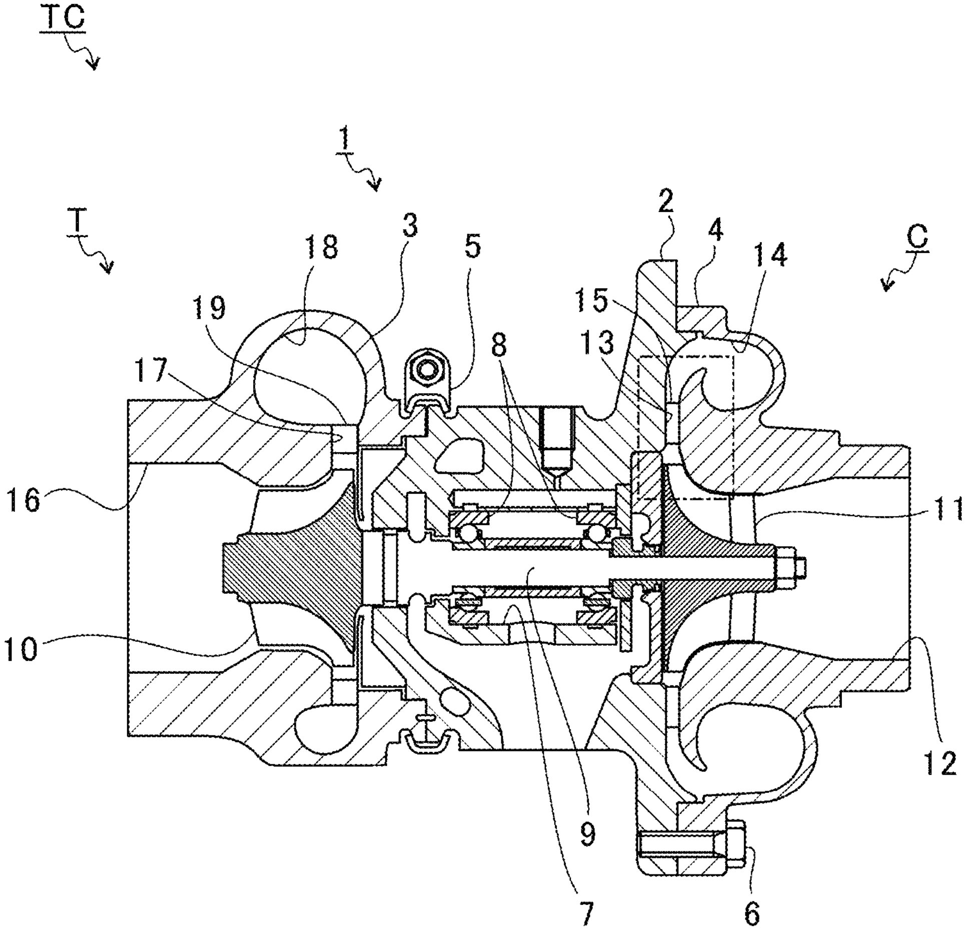
FIG. 1 is a schematic cross-sectional view illustrating a turbocharger according to an embodiment of the present disclosure.

FIG. 1 is a schematic cross-sectional view illustrating a turbocharger TC according to the present embodiment. Hereinafter, a description is given on the premise that the left side in FIG. 1 is the left side of the turbocharger TC.

Descriptions are given on the premise that the right side in FIG. 1 is the right side of the turbocharger TC. As illustrated in FIG. 1, the turbocharger TC includes a turbocharger main body 1. The turbocharger main body 1 includes a bearing housing 2, a turbine housing 3, and a compressor housing 4.

The turbine housing 3 is connected to the left side of the bearing housing 2 by a fastening mechanism 5. The fastening mechanism 5 is, for example, a G coupling. The compressor housing 4 is connected to the right side of the bearing housing 2 by a fastening bolt 6. The turbocharger TC includes a turbine T and a centrifugal compressor C. The turbine T includes the bearing housing 2 and the turbine housing 3. The centrifugal compressor C includes the bearing housing 2 and the compressor housing 4.

A bearing hole 7 is formed in the bearing housing 2. The bearing hole 7 penetrates through the turbocharger TC in the left-right direction. A bearing 8 is provided in the bearing hole 7. In FIG. 1, a rolling bearing is illustrated as an example of the bearing 8. However, the bearing 8 may be another bearing such as a semi-floating bearing or a full-floating bearing. The bearing 8 pivotally supports the shaft 9 in a freely rotatable manner. At the left end of the shaft 9, a turbine impeller 10 is provided. The turbine impeller is also referred to as a turbine blade wheel. The turbine impeller 10 is accommodated in the turbine housing 3 in a freely rotatable manner. At the right end of the shaft 9, a compressor impeller 11 is provided. The compressor impeller 11 is accommodated in the compressor housing 4 in a freely rotatable manner.

Hereinafter, the axial direction, the radial direction, and the circumferential direction of the turbocharger TC are simply referred to as the axial direction, the radial direction, and the circumferential direction, respectively. The axial direction of the turbocharger TC coincides with the axial direction of the shaft 9, the axial direction of the turbine impeller 10, and the axial direction of the compressor impeller 11. The radial direction of the turbocharger TC coincides with the radial direction of the shaft 9, the radial direction of the turbine impeller 10, and the radial direction of the compressor impeller 11. The circumferential direction of the turbocharger TC coincides with the circumferential direction of the shaft 9, the circumferential direction of the turbine impeller 10, and the circumferential direction of the compressor impeller 11.

An intake port 12 is formed in the compressor housing 4. The intake port 12 opens to the right side of the turbocharger TC. The intake port 12 is connected to an air cleaner (not illustrated). Facing surfaces of the bearing housing 2 and the compressor housing 4 constitute a diffuser flow path 13. The diffuser flow path 13 pressurizes the air. The diffuser flow path 13 is formed in an annular shape. The diffuser flow path 13 communicates with the intake port 12 via a space where the compressor impeller 11 is disposed on the radially inner side.

In addition, a compressor scroll flow path 14 is formed in the compressor housing 4. The compressor scroll flow path 14 is formed in an annular shape. The compressor scroll flow path 14 is positioned, for example, on an outer side in the radial direction with respect to the diffuser flow path 13. The compressor scroll flow path 14 communicates with an intake port of an engine (not illustrated) and the diffuser flow path 13. When the compressor impeller 11 rotates, the air is sucked from the intake port 12 into the compressor housing 4. The sucked air is pressurized and accelerated in the process of flowing between blades of the compressor impeller 11. The pressurized and accelerated air is further pressurized by the diffuser flow path 13 and the compressor scroll flow path 14. The pressurized air is guided to the intake port of the engine.

The diffuser flow path 13 is provided with a plurality of vanes 15. The plurality of vanes 15 is spaced apart in the circumferential direction of the compressor impeller 11 on the radially outer side of the compressor impeller 11. The vanes 15 are provided in such a manner as to be turnable about the turning axis extending in the rotation axis direction of the compressor impeller 11. Each of the vanes extends while crossing the radial direction of the compressor impeller 11. The plurality of vanes 15 has a function of adjusting the flow rate of the air sent radially outward from the compressor impeller 11 to the compressor scroll flow path 14. Specifically, the air sent radially outward from the compressor impeller 11 passes between the vanes 15 adjacent to each other, whereby the flow rate of the air decreases, and the pressure increases. This pressurizes the air in the diffuser flow path 13.

An exhaust port 16 is formed in the turbine housing 3. The exhaust port 16 opens to the left side of the turbocharger TC. The exhaust port 16 is connected to an exhaust gas purification device (not illustrated). A communication flow path 17 and a turbine scroll flow path 18 are formed in the turbine housing 3. The turbine scroll flow path 18 is positioned on the outer side in the radial direction with respect to the turbine impeller 10. The communication flow path 17 is positioned between the turbine impeller 10 and the turbine scroll flow path 18.

The turbine scroll flow path 18 communicates with a gas inlet port (not illustrated). Exhaust gas discharged from an exhaust manifold of the engine (not illustrated) is guided to the gas inlet port. The communication flow path 17 communicates the turbine scroll flow path 18 and the exhaust port 16. The exhaust gas guided from the gas inlet port to the turbine scroll flow path 18 is guided to the exhaust port 16 via the communication flow path 17 and spaces between blades of the turbine impeller 10. The exhaust gas rotates the turbine impeller 10 in the process of flowing therethrough. The turning force of the turbine impeller 10 is transmitted to the compressor impeller 11 via the shaft 9. As described above, the turning force of the compressor impeller 11 causes the air to be pressurized and to be guided to the intake port of the engine.

The communication flow path 17 is provided with a plurality of vanes 19. The plurality of vanes 19 is spaced apart in the circumferential direction of the turbine impeller 10 on the radially outer side of the turbine impeller 10. The vanes 19 are provided in such a manner as to be turnable about the turning axis extending in the rotation axis direction of the turbine impeller 10. Each of the vanes 19 extends while crossing the radial direction of the turbine impeller 10. The plurality of vanes 19 has a function of adjusting the flow rate of the exhaust gas sent radially inward from the turbine scroll flow path 18 to the turbine impeller 10. Specifically, the exhaust gas sent radially inward from the turbine scroll flow path 18 passes between the vanes 19 adjacent to each other, whereby the flow rate of the exhaust gas decreases, and the pressure increases. As a result, the exhaust gas is pressurized in the communication flow path 17.

Figure 2:
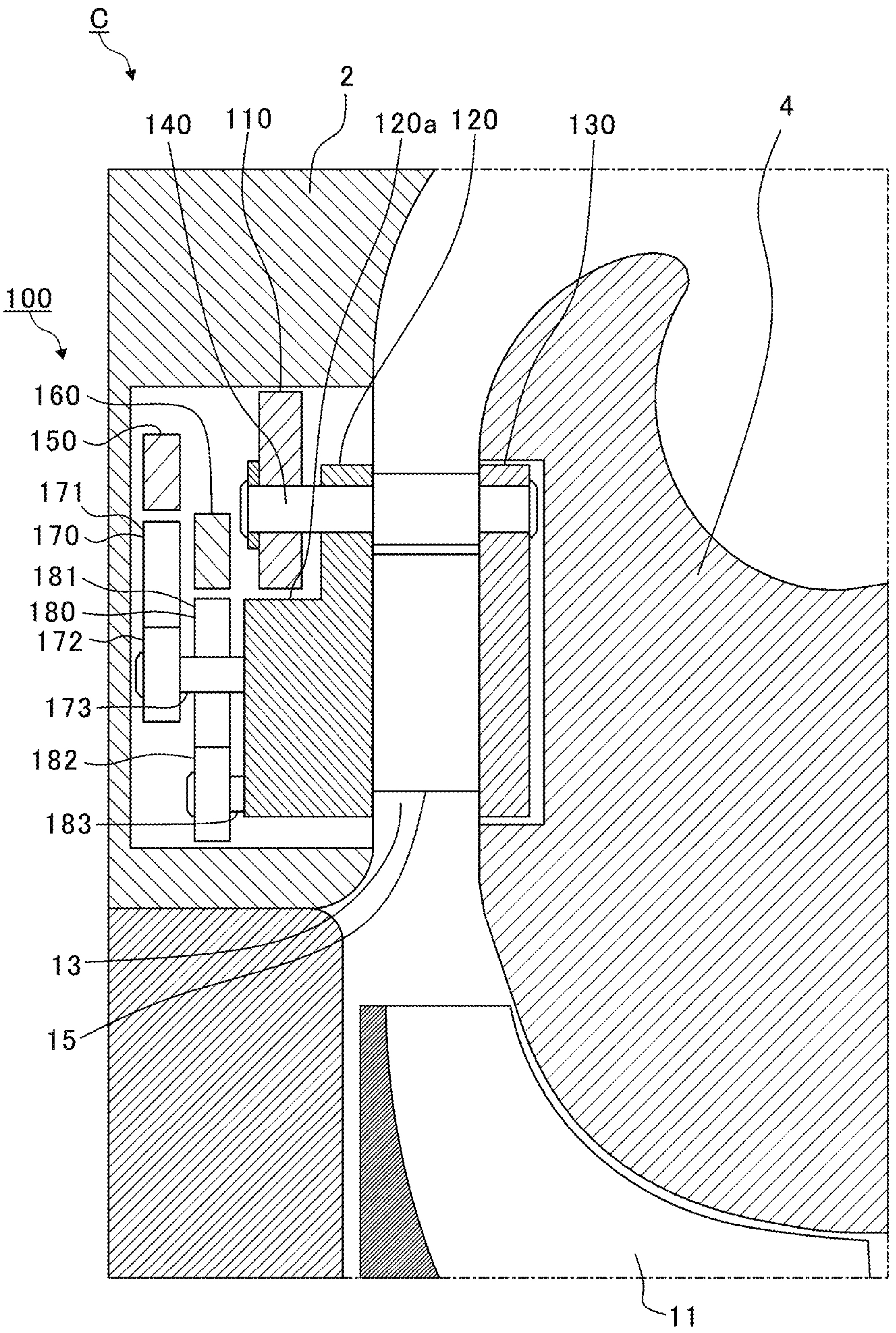
FIG. 2 is an extracted diagram of an alternate long and short dash line portion of FIG. 1.
Figure 3:
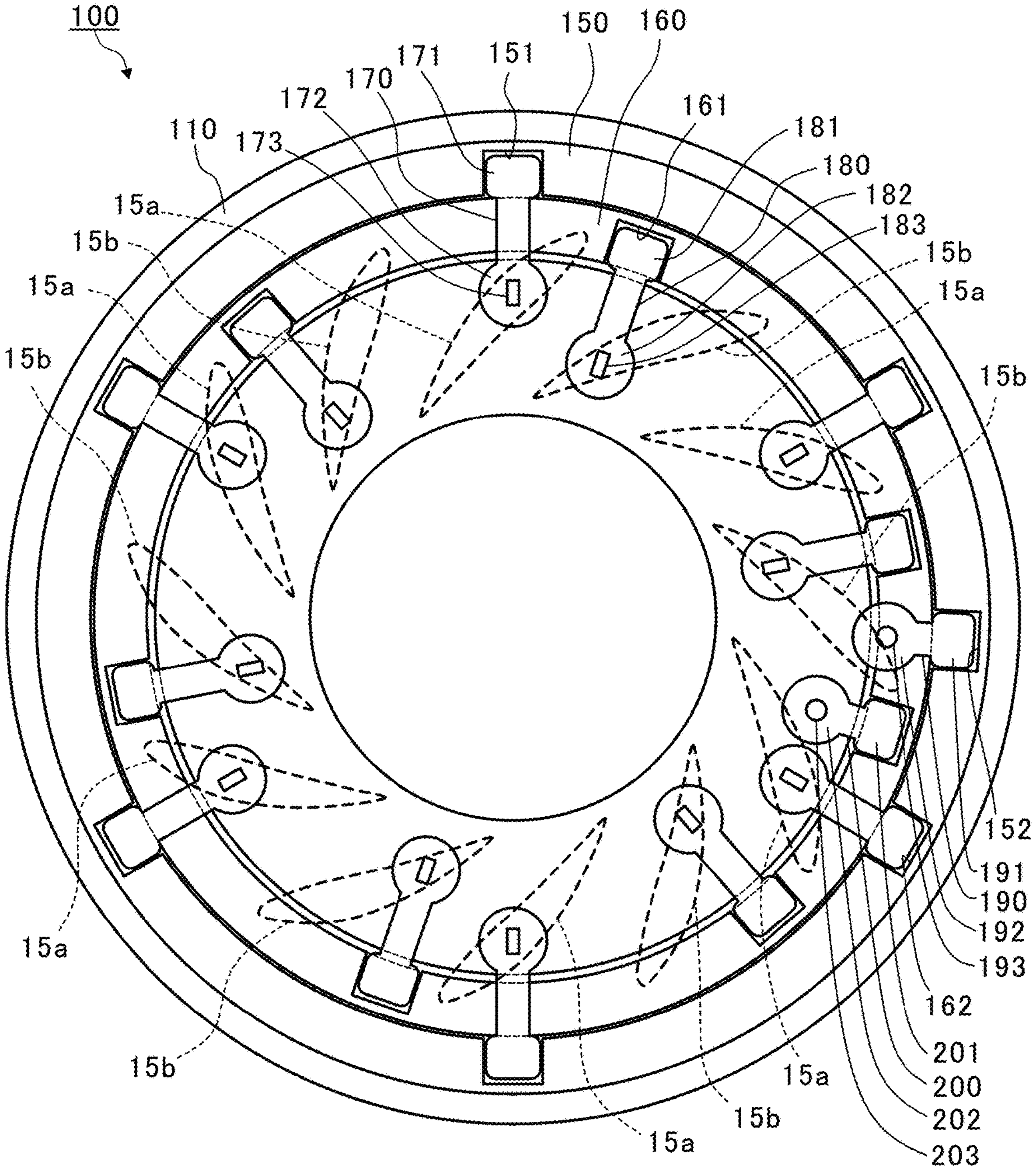
FIG. 3 is a diagram of a drive mechanism as viewed from the left side of FIG. 2.

FIG. 2 is an extracted diagram of an alternate long and short dash line portion of FIG. 1. As illustrated in FIG. 2, the centrifugal compressor C is provided with a drive mechanism 100 that rotates the vanes 15. In FIG. 1 described above, illustration of the drive mechanism 100 is omitted. FIG. 3 is a diagram of the drive mechanism 100 as viewed from the left side of FIG. 2. The centrifugal compressor C is provided with the drive mechanism 100 and corresponds to an exemplary rotary machine. However, as will be described later, the drive mechanism 100 may be provided in the turbine T.

As illustrated in FIGS. 2 and 3, the drive mechanism 100 includes a first ring 110, a second ring 120, a third ring 130, a coupling pin 140, a first drive ring 150, a second drive ring 160, first links 170, second links 180, a first drive link 190, and a second drive link 200. Note that the drive mechanism 100 is not limited to the example described below as long as it is a mechanism capable of rotating the plurality of vanes 15.

The first ring 110, the second ring 120, the third ring 130, and the coupling pin 140 will be described mainly by referring to FIG. 2.

The first ring 110, the second ring 120, and the third ring 130 are annular members extending in the circumferential direction of the compressor impeller 11. The first ring 110, the second ring 120, and the third ring 130 are coaxially arranged. The first ring 110, the second ring 120, and the third ring 130 extend on a plane orthogonal to the rotation axis direction of the compressor impeller 11. The first ring 110 and the second ring 120 are disposed inside the bearing housing 2. The first ring 110 and the second ring 120 face the diffuser flow path 13 from the left side. The third ring 130 is disposed in the compressor housing 4. The third ring 130 faces the diffuser flow path 13 from the right side.

The first ring 110 is fixed to the bearing housing 2. For example, the outer circumferential portion of the first ring 110 is fixed to the bearing housing 2. An annular recessed portion 120*a* is formed on the left side of an outer circumferential portion of the second ring 120. The first ring 110 is disposed in the recessed portion 120*a*. The inner diameter of the first ring 110 is slightly larger than the outer diameter of the recessed portion 120*a*. The outer diameter of the first ring 110 is larger than the outer diameter of a portion of the second ring 120 where the recessed portion 120*a* is not formed.

The second ring 120 and the third ring 130 face each other in the rotation axis direction via the diffuser flow path 13. The vanes 15 are located between the second ring 120 and the third ring 130. The inner diameter of the second ring 120 and the inner diameter of the third ring 130 substantially coincide with each other. The outer diameter of the portion of the second ring 120 where the recessed portion 120*a* is not formed substantially coincides with the outer diameter of the third ring 130. The coupling pin 140 penetrates the first ring 110, the second ring 120, and the third ring 130 in the rotation axis direction and couples the first ring 110, the second ring 120, and the third ring 130. For example, a plurality of coupling pins 140 is provided spaced apart in the circumferential direction.

The first drive ring 150, the second drive ring 160, the first links 170, the second links 180, the first drive link 190, and the second drive link 200 will be described mainly with reference to FIG. 3.

The first drive ring 150 is an annular member extending in the circumferential direction. The first drive ring 150 is disposed coaxially with the first ring 110, the second ring 120, and the third ring 130. The first drive ring 150 extends on a plane orthogonal to the rotation axis direction of the compressor impeller 11. The first drive ring 150 is disposed inside the bearing housing 2. The first drive ring 150 is disposed on the left side of FIG. 2 with respect to the first ring 110 and the second ring 120. The first drive ring 150 is provided in such a manner as to be turnable in the circumferential direction.

The second drive ring 160 is an annular member extending in the circumferential direction. The second drive ring 160 is disposed coaxially with the first ring 110, the second ring 120, and the third ring 130. The second drive ring 160 extends on a plane orthogonal to the rotation axis direction of the compressor impeller 11. The second drive ring 160 is disposed inside the bearing housing 2. The second drive ring 160 is disposed on the left side of FIG. 2 with respect to the first ring 110 and the second ring 120 and on the right side of FIG. 2 with respect to the first drive ring 150. The second drive ring 160 is provided in such a manner as to be turnable in the circumferential direction.

In the present embodiment, the first drive ring 150 and the second drive ring 160 are interlocked. That is, when one of the first drive ring 150 and the second drive ring 160 rotates in the circumferential direction, the other also rotates. However, the present disclosure is not limited to this and does not exclude embodiments in which the first drive ring 150 and the second drive ring 160 rotate individually.

The radial width of the first drive ring 150 substantially coincides with the radial width of the second drive ring 160. The outer diameter of the first drive ring 150 is larger than the outer diameter of the second drive ring 160. The inner diameter of the first drive ring 150 is larger than the inner diameter of the second drive ring 160. The inner diameter of the first drive ring 150 is slightly larger than the outer diameter of the second drive ring 160. However, the dimensional relationship between the first drive ring 150 and the second drive ring 160 is not limited to this example. For example, the radial width of the first drive ring 150 and the radial width of the second drive ring 160 may be different from each other. The outer diameter of the first drive ring 150 may be smaller than the outer diameter of the second drive ring 160. The inner diameter of the first drive ring 150 may be smaller than the inner diameter of the second drive ring 160. The inner diameter of the first drive ring 150 may be smaller than the outer diameter of the second drive ring 160.

As described above, the vanes 15 are provided in such a manner as to be turnable about the turning axis extending in the rotation axis direction of the compressor impeller 11. As illustrated in FIG. 3, the plurality of vanes 15 includes first vanes 15*a* and second vanes 15*b* whose turning axes in the radial direction of the compressor impeller 11 have mutually different relative positions. In other words, the above relative position is a radial position of the turning axis of the vanes 15 and is a relative position with respect to the vanes 15 (for example, a positional relationship between the leading edges and trailing edges of the vanes 15 and the turning axis).

The plurality of vanes 15 includes the same number of first vanes 15*a* and second vanes 15*b*. In the plurality of vanes 15, the first vanes 15*a* and the second vanes 15*b* are alternately arranged in the circumferential direction. In the present embodiment, a first vane 15*a* and a second vane 15*b* have substantially congruent shapes. In the example of FIG. 3, the number of first vanes 15*a* and the number of second vanes 15*b* are six each. The turning axis of a first vane 15*a* is positioned coaxially with a shaft 173 to be described later. The turning axis of a second vane 15*b* is positioned coaxially with a shaft 183 to be described later. The relative position of the turning axis of a second vane 15*b* in the radial direction is on a radially inner side with respect to the relative position of the turning axis of a first vane 15*a* in the radial direction.

A first link 170 is a substantially rod-shaped member. A plurality of first links 170 is provided spaced apart in the circumferential direction. A first end 171 of a first link 170 is engaged with the first drive ring 150. Specifically, a groove 151 is formed in the inner curved surface of the first drive ring 150. A plurality of grooves 151 is formed spaced apart in the circumferential direction. The plurality of grooves 151 is formed at equal intervals. However, the plurality of grooves 151 may be formed at unequal intervals. A first end 171 of each of the first links 170 is engaged with one of the grooves 151. A first link 170 extends radially inward from a groove 151. In the example of FIG. 3, the number of grooves 151 and the number of first links 170 are six each.

A second end 172 of a first link 170 is provided in such a manner as to be integrally turnable with a first vane 15*a* about the turning axis of the first vane 15*a*. Specifically, a shaft 173 extending in the rotation axis direction of the compressor impeller 11 is attached to the second end 172 of the first link 170. The shaft 173 protrudes from the second end 172 of the first link 170 to the right side in FIG. 2. The shaft 173 is connected to the first vane 15*a* and is provided in such a manner as to be turnable integrally with the first vane 15*a* about the shaft 173. As described above, the first vane 15*a* is provided in such a manner as to be turnable about the shaft 173. That is, the turning axis of the first vane 15*a* is located coaxially with the shaft 173.

A second link 180 is a substantially rod-shaped member. A plurality of second links 180 is provided spaced apart in the circumferential direction. A first end 181 of a second link 180 is engaged with the second drive ring 160. Specifically, a groove 161 is formed on an inner curved surface of the second drive ring 160. A plurality of grooves 161 is formed spaced apart in the circumferential direction. The plurality of grooves 161 are provided at equal intervals. However, the plurality of grooves 161 may be provided at unequal intervals. A first end 181 of each of the second links 180 is engaged with one of the grooves 161. A second link 180 extends radially inward from a groove 161. In the example of FIG. 3, the number of grooves 161 and the number of second links 180 are six each.

A second end 182 of the second link 180 is provided in such a manner as to be integrally turnable with a second vane 15*b* about the turning axis of the second vane 15*b*. Specifically, a shaft 183 extending in the rotation axis direction of the compressor impeller 11 is attached to the second end 182 of the second link 180. The shaft 183 protrudes from the second end 182 of the second link 180 to the right side in FIG. 2. The shaft 183 is connected to the second vane 15*b* and is provided in such a manner as to be turnable integrally with the second vane 15*b* about the shaft 183. As described above, the second vane 15*b* is provided in such a manner as to be turnable about the shaft 183. That is, the turning axis of the second vane 15*b* is located coaxially with the shaft 183.

In the circumferential direction, the grooves 151 of the first drive ring 150 and the grooves 161 of the second drive ring 160 are alternately arranged. Therefore, the first links 170 and the second links 180 are alternately arranged in the circumferential direction. Accordingly, it is appropriately implemented that the first vanes 15*a* and the second vanes 15*b* are alternately arranged in the circumferential direction.

The length of a first link 170 in the extending direction substantially coincides with the length of a second link 180 in the extending direction. Therefore, the radial position of the shaft 183 provided at the second end 182 of the second link 180 is located on a radially inner side with respect to the radial position of a shaft 173 provided at a second end 172 of a first link 170. As a result, the relative position of the turning axis of the second vane 15*b* in the radial direction is located on a radially inner side with respect to the relative position of the turning axis of the first vane 15*a* in the radial direction.

The first drive link 190 is a substantially rod-shaped member. The first drive link 190 is for transmitting a turning force to the first drive ring 150. A first end 191 of the first drive link 190 is engaged with the first drive ring 150. Specifically, a groove 152 is formed in the inner curved surface of the first drive ring 150. The first end 191 of the first drive link 190 is engaged with the groove 152. A shaft 193 extending in the rotation axis direction of the compressor impeller 11 is attached to a second end 192 of the first drive link 190. The shaft 193 protrudes from the second end 192 of the first drive link 190 to the left side in FIG. 2.

The shaft 193 is connected with an actuator (not illustrated). With the actuator being driven, the turning force is transmitted to the first drive ring 150 via the first drive link 190, whereby the first drive ring 150 turns. As a result, the first links 170 rotate integrally with the first vanes 15*a*, and the attitude of the first vanes 15*a* changes.

The second drive link 200 is a substantially rod-shaped member. The second drive link 200 is for transmitting a turning force to the second drive ring 160. A first end 201 of the second drive link 200 is engaged with the second drive ring 160. Specifically, a groove 162 is formed on an inner curved surface of the second drive ring 160. The first end 201 of the second drive link 200 is engaged with the groove 162. A shaft 203 extending in the rotation axis direction of the compressor impeller 11 is attached to a second end 202 of the second drive link 200. The shaft 203 protrudes from the second end 202 of the second drive link 200 to the left side in FIG. 2.

The shaft 203 is connected with an actuator (not illustrated). The actuator may be the same as or different from the actuator connected to the shaft 193 of the first drive link 190. With the actuator being driven, the turning force is transmitted to the second drive ring 160 via the second drive link 200, whereby the second drive ring 160 turns. As a result, the second links 180 rotate integrally with the second vanes 15*b*, and the attitude of the second vanes 15*b* changes.

Figure 4:
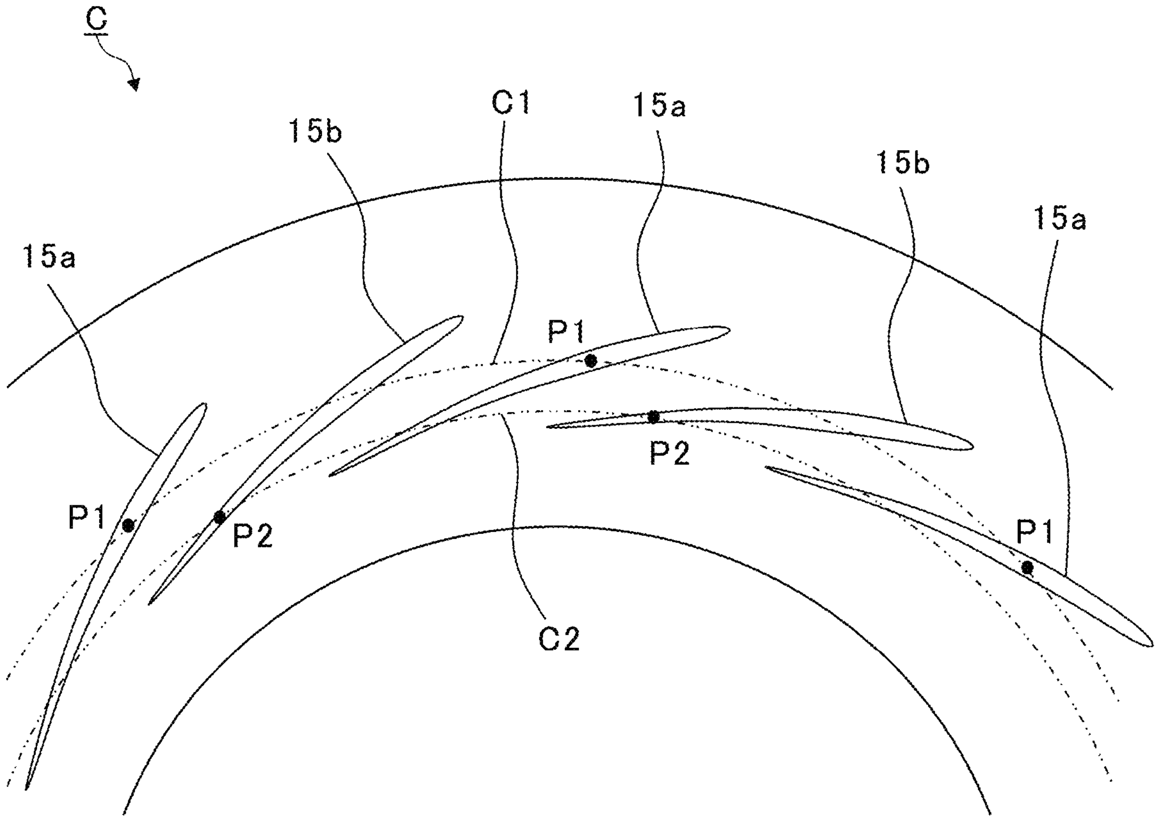
FIG. 4 is a diagram illustrating a reference state of a plurality of vanes.
Figure 5:
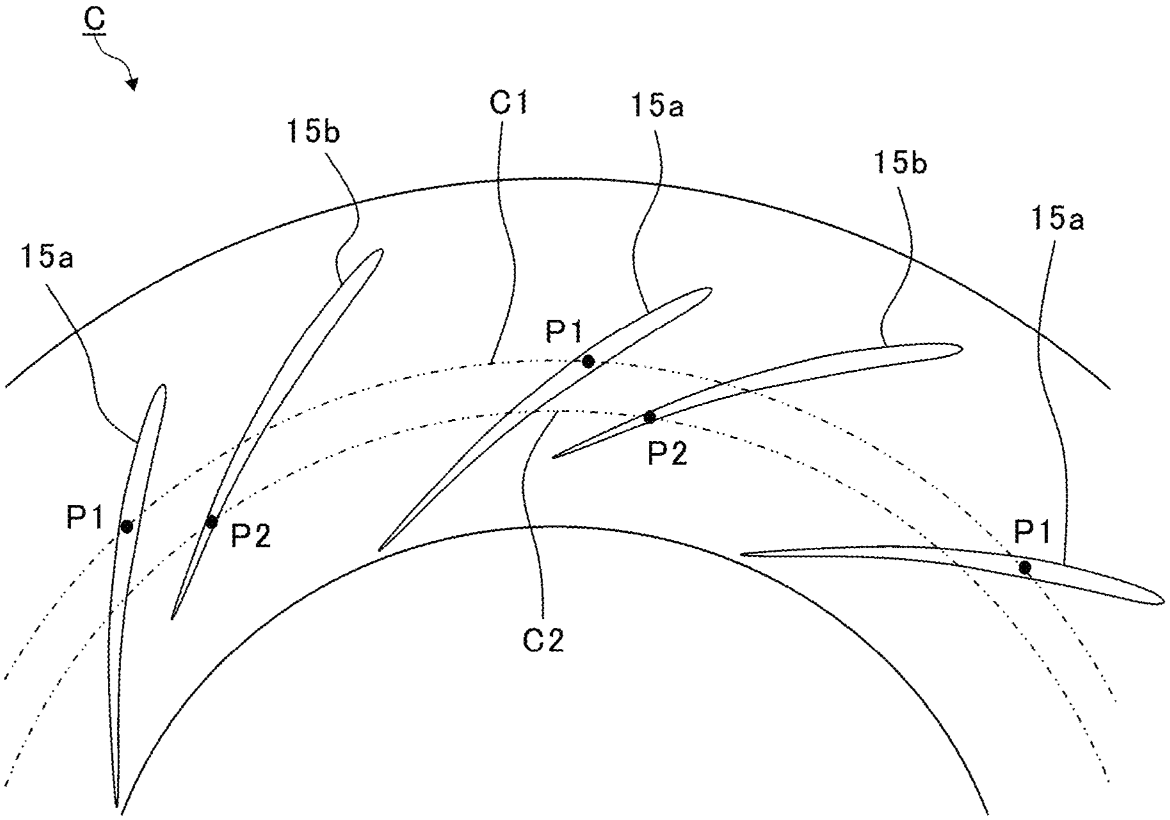
FIG. 5 is a diagram illustrating a state in which the plurality of vanes is rotated from the reference state.

FIG. 4 is a diagram illustrating a reference state of the plurality of vanes 15. FIG. 4 and FIG. 5 described later are enlarged diagrams of some of the vanes 15 in FIG. 3. As illustrated in FIG. 4, in the reference state, the inclination with respect to the circumferential direction and the position in the radial direction of the first vanes 15*a* coincide with the inclination with respect to the circumferential direction and the position in the radial direction of the second vanes 15*b*, respectively. Hereinafter, the clockwise direction in FIGS. 4 and 5 described later is also simply referred to as a clockwise direction.

In FIG. 4 and FIG. 5 described later, the position of the turning axis of a first vane 15*a* is indicated by a point P1, and the position of the turning axis of a second vane 15*b* is indicated by a point P2. The point P2 is located on a radially inner side with respect to the point P1. Points P1 corresponding to the respective first vanes 15*a* are located on a circle C1. Points P2 corresponding to the respective second vanes 15*b* are located on a circle C2. The circle C1 and the circle C2 are arranged coaxially with the compressor impeller 11. The radius of the circle C2 is smaller than the radius of the circle C1.

A first vane 15*a* is turnable about a point P1. When the first vane 15*a* turns, the inclination of the first vane 15*a* with respect to the circumferential direction changes. A second vane 15*b* is turnable about a point P2. When the second vane 15*b* turns, the inclination of the second vane 15*b* with respect to the circumferential direction changes.

As illustrated in FIG. 4, in the reference state, the first vanes 15*a* and the second vanes 15*b* are arranged rotationally symmetrically. In the example of FIG. 4, in the reference state, the plurality of vanes 15 including the first vanes 15*a* and the second vanes 15*b* are arranged at equal intervals in the circumferential direction. However, in the reference state, the plurality of vanes 15 may be arranged at unequal intervals in the circumferential direction. In the reference state, the inclination of the first vanes 15*a* with respect to the circumferential direction and the inclination of the second vanes 15*b* with respect to the circumferential direction coincide with each other. In the reference state, the inclinations of the first vanes 15*a* and the second vanes 15*b* with respect to the circumferential direction are minimized. That is, the first vanes 15*a* and the second vanes 15*b* cannot turn clockwise from the reference state but can turn only counterclockwise.

FIG. 5 is a diagram illustrating a state in which the plurality of vanes 15 is turned from the reference state. As illustrated in FIG. 5, when the first vanes 15*a* and the second vanes 15*b* turn from the reference state, the inclination of each of the vanes 15 with respect to the circumferential direction becomes larger than that in the reference state. As described above, in the centrifugal compressor C, the relative position of the turning axis of the first vane 15*a* (namely, the axis located at the point P1) in the radial direction and the relative position of the turning axis of the second vane 15*b* (namely, the axis located at the point P2) in the radial direction are different from each other. As a result, as illustrated in FIG. 5, when the vanes 15 turn from the reference state, the first vanes 15*a* and the second vanes 15*b* are not arranged rotationally symmetrically.

When the vanes 15 turn from the reference state, the vanes 15 are in a state close to the compressor impeller 11. As a result, the compressor impeller 11 rotates in the vicinity of the vanes 15, and the pressure acting on the compressor impeller 11 fluctuates. In this state, in a case where the first vanes 15*a* and the second vanes 15*b* are arranged rotationally symmetrically, the pressure acting on the compressor impeller 11 fluctuates by the same number of times as the total number of the vanes 15 while the compressor impeller 11 rotates once. Therefore, the frequency of the fluctuation in the pressure acting on the compressor impeller 11 is the frequency corresponding to the total number of the vanes 15.

Meanwhile, in the centrifugal compressor C, in a case where the vanes 15 turn from the reference state, the first vanes 15*a* and the second vanes 15*b* are not arranged rotationally symmetrically. In this manner, the frequency of the fluctuation of the pressure acting on the compressor impeller 11 can be reduced. Specifically, in the above example, the frequency of the fluctuation in the pressure acting on the compressor impeller 11 is a frequency corresponding to half of the total number of the vanes 15. Therefore, by setting the frequency of the fluctuation of the pressure acting on the compressor impeller 11 to be lower than the specific frequency of the compressor impeller 11, it is possible to suppress the occurrence of resonance in the compressor impeller 11. Therefore, breakage of the compressor impeller 11 caused by resonance can be suppressed.

In particular, in the centrifugal compressor C, in the plurality of vanes 15, the first vanes 15*a* and the second vanes 15*b* are alternately arranged in the circumferential direction of the compressor impeller 11. Accordingly, the flow of air passing through the diffuser flow path 13 can be prevented from being non-uniform in the circumferential direction. Therefore, the efficiency of the centrifugal compressor C can be improved.

However, in the plurality of vanes 15, the first vanes 15*a* and the second vanes 15*b* may not be alternately arranged in the circumferential direction. For example, in some of the plurality of vanes 15, two first vanes 15*a* may be adjacent to each other, and two second vanes 15*b* may be adjacent to each other. In addition, the plurality of vanes may further include, in addition to the first vanes 15*a* and the second vanes 15*b*, a vane 15 whose turning axis has a relative position in the radial direction that is different from any of those of the first vanes 15*a* and the second vanes 15*b*. In addition, the total number of the vanes 15 is not limited to the example of FIG. 3.

In particular, the centrifugal compressor C includes: the first drive ring 150 extending in the circumferential direction and provided in such a manner as to be turnable in the circumferential direction; the first links 170 having a first end 171 engaged with the first drive ring 150 and a second end 172 provided in such a manner as to be turnable integrally with a first vane 15*a* about the turning axis of the first vane 15*a*; the second drive ring 160 extending in the circumferential direction and provided in such a manner as to be turnable in the circumferential direction; and the second links 180 having a first end 181 engaged with the second drive ring 160 and a second end 182 provided in such a manner as to be turnable integrally with a second vane 15*b* about the turning axis of the second vane 15*b*. As a result, it is appropriately implemented to turn the first vanes 15*a* and the second vanes 15*b* whose turning axes in the radial direction have mutually different relative positions.

In particular, in the centrifugal compressor C, the plurality of vanes 15 can transition to the reference state in which the inclination with respect to the circumferential direction and the position in the radial direction of the first vanes 15*a* coincide with the inclination with respect to the circumferential direction and the position in the radial direction of the second vanes 15*b*, respectively. Therefore, for example, in a case where the possibility that resonance occurs in the compressor impeller 11 is low, the flow of air passing through the diffuser flow path 13 can be made more uniform in the circumferential direction by bringing the plurality of vanes 15 into the reference state. Therefore, the efficiency of the centrifugal compressor C can be further improved. Note that the plurality of vanes 15 may be unable to transition to the reference state.

In particular, in the centrifugal compressor C, the inclination of the first vane 15*a* and the second vane 15*b* with respect to the circumferential direction is minimized in the reference state. In a case where the inclinations of the first vanes 15*a* and the second vanes 15*b* with respect to the circumferential direction are minimized, each of the vanes 15 is in a state of being far from the compressor impeller 11. In this case, since the fluctuation of the pressure acting on the compressor impeller 11 hardly occurs, the possibility that resonance occurs in the compressor impeller 11 is reduced. Therefore, in such a situation, by bringing the plurality of vanes 15 into the reference state, it is possible to suppress the occurrence of resonance in the compressor impeller 11 and to further make the flow of the air passing through the diffuser flow path 13 more uniform in the circumferential direction. Note that each of the vanes may be turnable such that the inclination of the vane 15 with respect to the circumferential direction is further smaller than the inclination in the reference state. For example, the first vanes

15*a* and the second vanes 15*b* may be turnable further clockwise from the reference state illustrated in FIG. 4.

Although the embodiments of the present disclosure have been described with reference to the accompanying drawings, it is naturally understood that the present disclosure is not limited to the above embodiments. It is clear that those skilled in the art can conceive various modifications or variations within the scope described in the claims, and it is understood that they are naturally also within the technical scope of the present disclosure.

In the above description, an example has been given in which the drive mechanism 100 is provided for the vanes 15 of the centrifugal compressor C, which is a rotary machine. However, the drive mechanism 100 may be provided for the vanes 19 of the turbine T, which is a rotary machine. The drive mechanism 100 may be provided for both the vanes 15 of the centrifugal compressor C and the vanes 19 of the turbine T or may be provided for either the vanes 15 of the centrifugal compressor C or the vanes 19 of the turbine T. The centrifugal compressor C and the turbine T correspond to an exemplary rotary machine.

The invention claimed is:

1. A rotary machine comprising:

an impeller; and a plurality of vanes arranged apart from each other in a circumferential direction of the impeller on a radially outer side with respect to the impeller, each of the vanes being provided in such a manner as to be turnable about a turning axis extending in a rotation axis direction of the impeller, the plurality of vanes including a first vane and a second vane, turning axes of the first vane and the second vane in a radial direction of the impeller have mutually different relative positions, wherein a range in which the first vane exists in the radial direction and a range in which the second vane exists in the radial direction at least partially overlap, regardless of attitudes of the first vane and the second vane.

2. The rotary machine according to claim 1, wherein, in the plurality of vanes, the first vane and the second vane are alternately arranged in the circumferential direction.

3. A turbocharger comprising the rotary machine according to claim 2.

4. The rotary machine according to claim 1, further comprising:

a first drive ring extending in the circumferential direction, the first drive ring being provided in such a manner as to be turnable in the circumferential direction;

a first link having a first end engaged with the first drive ring and a second end provided in such a manner as to be turnable integrally with the first vane about the turning axis of the first vane;

a second drive ring extending in the circumferential direction, the second drive ring being provided in such a manner as to be turnable in the circumferential direction; and a second link having a first end engaged with the second drive ring and a second end provided in such a manner as to be turnable integrally with the second vane about the turning axis of the second vane.

5. A turbocharger comprising the rotary machine according to claim 4.

6. The rotary machine according to claim 1, wherein the plurality of vanes can transition to a reference state in which an inclination with respect to the circumferential direction and a position in the radial direction of the first vane coincide with an inclination with respect to the circumferential direction and a position in the radial direction of the second vane, respectively.

7. The rotary machine according to claim 6, wherein in the reference state, the inclinations of the first vane and the second vane with respect to the circumferential direction are minimized.

8. A turbocharger comprising the rotary machine according to claim 7.

9. A turbocharger comprising the rotary machine according to claim 6.

10. A turbocharger comprising the rotary machine according to claim 1.

* * * * *